(12) United States Patent
Abdelaal et al.

(10) Patent No.: US 12,726,451 B2

(45) Date of Patent: Sep. 1, 2026

(54) SYSTEMS AND METHODS FOR MODIFYING INBOX ITEMS WITH QUICK ACTIONS

(71) Applicant: YAHOO ASSETS LLC, New York, NY (US)

(72) Inventors: Rofaida Abdelaal, Sunnyvale, CA (US); Bhopal Singh, San Jose, CA (US); Sanika Shirwadkar, Milpitas, CA (US); Abigail Aker, Takoma Park, MD (US); Gnanavel Shanmugam, San Jose, CA (US); Kyle Miller, Encinitas, CA (US); Matt Katz, New York, NY (US); Kenneth Sebastian, Danville, CA (US)

(73) Assignee: YAHOO ASSETS LLC, New York, NY (US)

( * ) Notice: Subject to any disclaimer, the term of this patent is extended or adjusted under 35 U.S.C. 154(b) by 24 days.

(21) Appl. No.: 18/738,740

(22) Filed: Jun. 10, 2024

(65) Prior Publication Data

US 2025/0379838 A1 Dec. 11, 2025

(51) Int. Cl.

| | |
|---|---|
| ***H04L 51/21*** | (2022.01) |
| ***G06F 40/205*** | (2020.01) |
| ***G06F 40/35*** | (2020.01) |
| ***H04L 51/18*** | (2022.01) |

(52) U.S. Cl.

CPC .............. *H04L 51/21* (2022.05); *H04L 51/18* (2013.01); *G06F 40/205* (2020.01); *G06F 40/35* (2020.01)

(58) Field of Classification Search

CPC ....... H04L 51/21; H04L 51/18; G06F 40/205; G06F 40/35

See application file for complete search history.

(56) References Cited

U.S. PATENT DOCUMENTS

2020/0202388 A1* 6/2020 Raviv .................. H04L 51/212
2021/0117999 A1* 4/2021 He ..................... G06Q 30/0211

* cited by examiner

*Primary Examiner* — Soe Hlaing

(74) *Attorney, Agent, or Firm* — James J. DeCarlo; Greenberg Traurig, LLP

(57) ABSTRACT

Disclosed are systems and methods that provide a decision-intelligence (DI)-based, computerized framework that provides advancements in electronic messages are presented to users, as well as how users are capable of interacting with such messages, and the content included and/or referenced therein. The disclosed framework provides novel mechanisms for modifying how an electronic message is displayed within an account inbox, whereby such modifications enable interactions with the content in the message as well as the electronic/network resources associated with such message/content without requiring the message to be opened. Thus, streamlined mechanisms are provided that enable advanced capabilities for inbox management and interactions therefrom, which can reduce resource expenditure by the device accessing the inbox and the system hosting the inbox, as well increase in user experience.

20 Claims, 7 Drawing Sheets

400

SYSTEMS AND METHODS FOR MODIFYING INBOX ITEMS WITH QUICK ACTIONS

FIELD OF THE DISCLOSURE

The present disclosure relates to electronic messaging, and more particularly, to a decision intelligence (DI)-based computerized framework for determining and enabling interaction with electronic content within and associated with an electronic message without opening the electronic message.

SUMMARY OF THE DISCLOSURE

By way of background, triaging an inbox is a notoriously tedious task for users, often involving sifting through a barrage of emails that range from critical communications to spam and promotional messages. This process requires constant decision-making about what to prioritize, respond to, defer, delete, and the like. Such volume of emails can be overwhelming, leading to decision fatigue and a sense of frustration as users attempt to stay organized. Important emails can easily get buried under the weight of less relevant ones, necessitating meticulous scrutiny to ensure nothing crucial is missed. Additionally, managing email subscriptions, sorting through repetitive notifications, and dealing with follow-up reminders add to the complexity. The repetitive nature of these actions, combined with the cognitive load of categorizing and responding appropriately, makes inbox triaging a time-consuming and often exasperating task.

To that end, the disclosed systems and methods provide a novel computerized framework that operates in conjunction with inboxes of users to provide advanced capabilities that streamline the triaging process. According to some embodiments, as discussed herein in more detail, rather than requiring users to open messages to perform actions required and/or requested by such emails, via the advent of the disclosed technology users can perform such actions without having to open their emails.

For example, when a user receives an email from their insurance provider which includes a bill, the disclosed framework can operate to display the message within the user's inbox with additional functionality that enables the user to access the bill via the insurance provider's website without having to open the email. This can improve the user's experience, as well as reduce resources for the email provider and user device. For example, rather than expending resources by the device in opening the message, which may involve a complex content scheme, the device can focus directly on accessing the important content for the user, as indicated via the user's interaction with the added functionality derived from data within the message (unopened) item.

According to some embodiments, a method is disclosed for a DI-based computerized framework for determining and enabling interaction with electronic content within and associated with an electronic message without opening the electronic message. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for determining and enabling interaction with electronic content within and associated with an electronic message without opening the electronic message.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
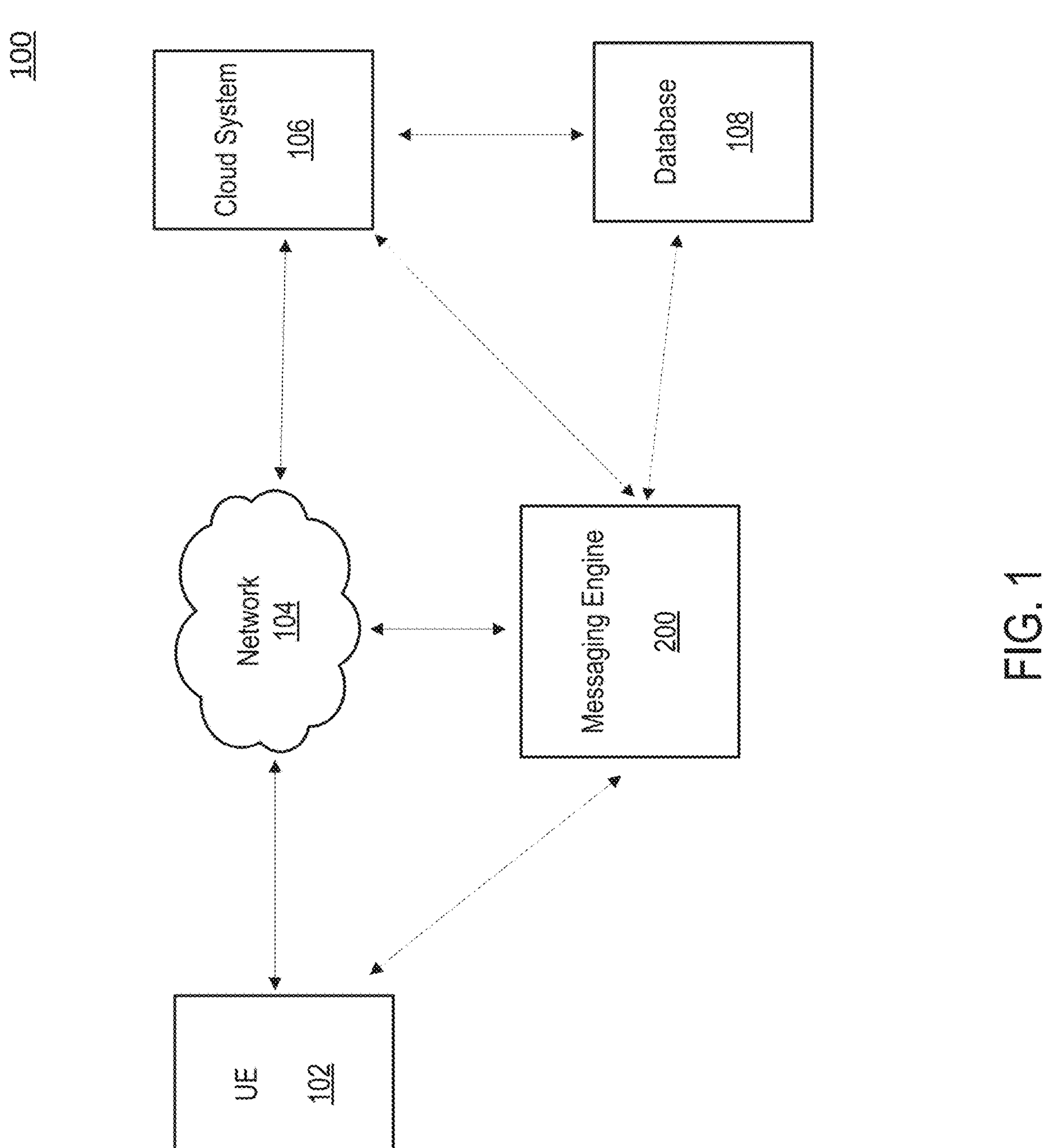
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment” as used herein does not necessarily refer to the same embodiment and the phrase “in another embodiment” as used herein does not necessarily refer to a different embodiment. It is intended, for example, that claimed subject matter include combinations of example embodiments in whole or in part.

In general, terminology may be understood at least in part from usage in context. For example, terms, such as “and”, “or”, or “and/or,” as used herein may include a variety of meanings that may depend at least in part upon the context in which such terms are used. Typically, “or” if used to associate a list, such as A, B or C, is intended to mean A, B, and C, here used in the inclusive sense, as well as A, B or C, here used in the exclusive sense. In addition, the term “one or more” as used herein, depending at least in part upon context, may be used to describe any feature, structure, or characteristic in a singular sense or may be used to describe combinations of features, structures or characteristics in a plural sense. Similarly, terms, such as “a,” “an,” or “the,” again, may be understood to convey a singular usage or to convey a plural usage, depending at least in part upon context. In addition, the term “based on” may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term “server” should be understood to refer to a service point which provides processing, database, and communication facilities. By way of example, and not limitation, the term “server” can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a “network” should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a “wireless network” should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes user equipment (UE) 102 (e.g., a client device, as mentioned above and discussed below in relation to FIG. 7), network 104, cloud system 106, database 108, and messaging engine 200. It should be understood that while system 100 is depicted as including such components, it should not be construed as limiting, as one of ordinary skill in the art would readily understand that varying numbers of UEs, peripheral devices, cloud systems, databases, network resources, engines and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, Internet of Things (IoT) device, autonomous machine, and any other device equipped with a cellular or wireless or wired transceiver.

In some embodiments, a peripheral device (not shown) can be connected to UE 102, and can be any type of peripheral device, such as, but not limited to, a wearable device (e.g., smart watch), printer, speaker, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a network and/or electronic mail platform (e.g., Yahoo! Mail®, for example), which has associated network resources hosted on the internet or private network (e.g., network 104), which enables (via engine 200) the tagging and search functionality and capabilities discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE, and the services and applications provided by cloud system 106 and/or messaging engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
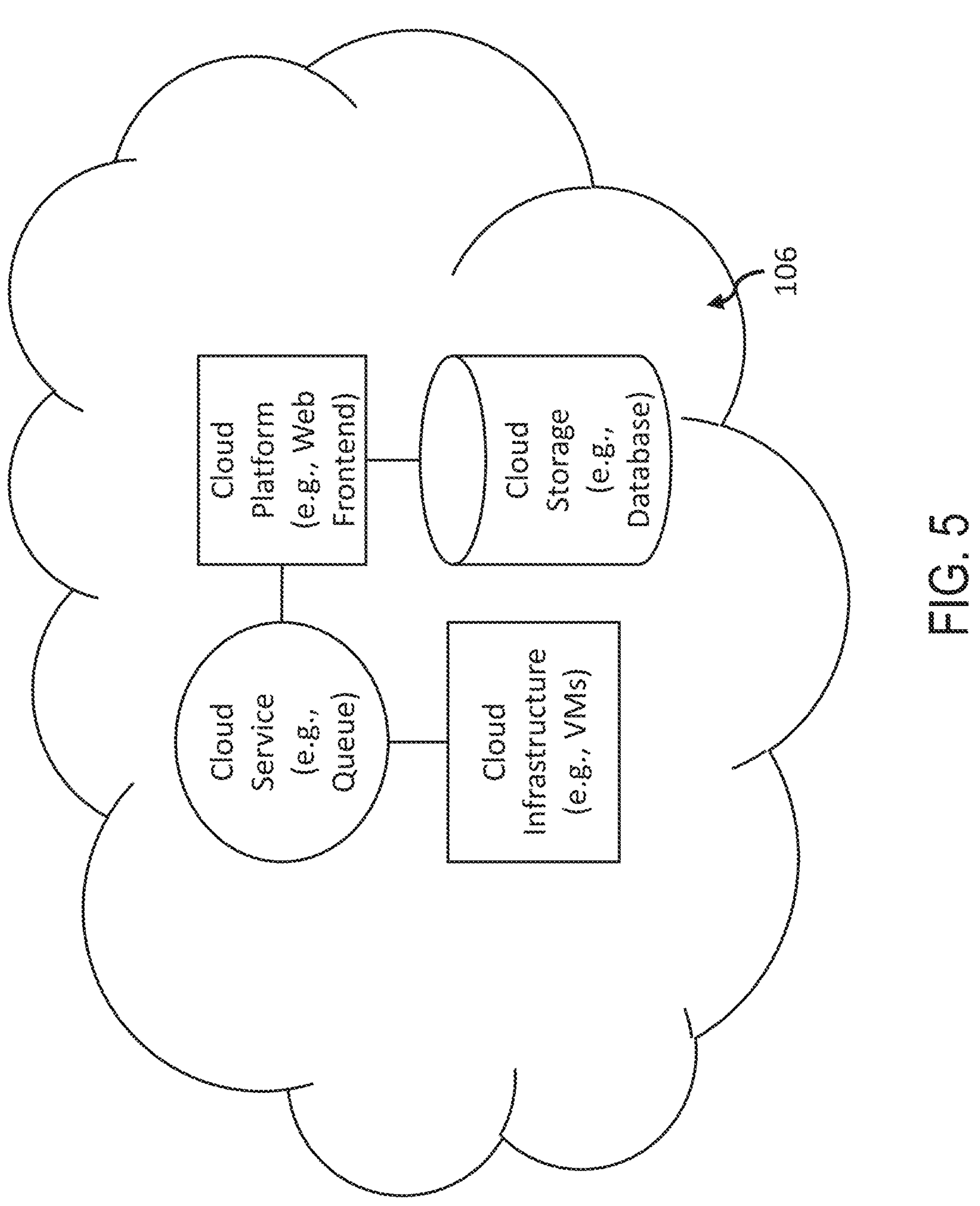
FIG. 5 depicts an exemplary implementation of an architecture according to some embodiments of the present disclosure.
Figure 6:
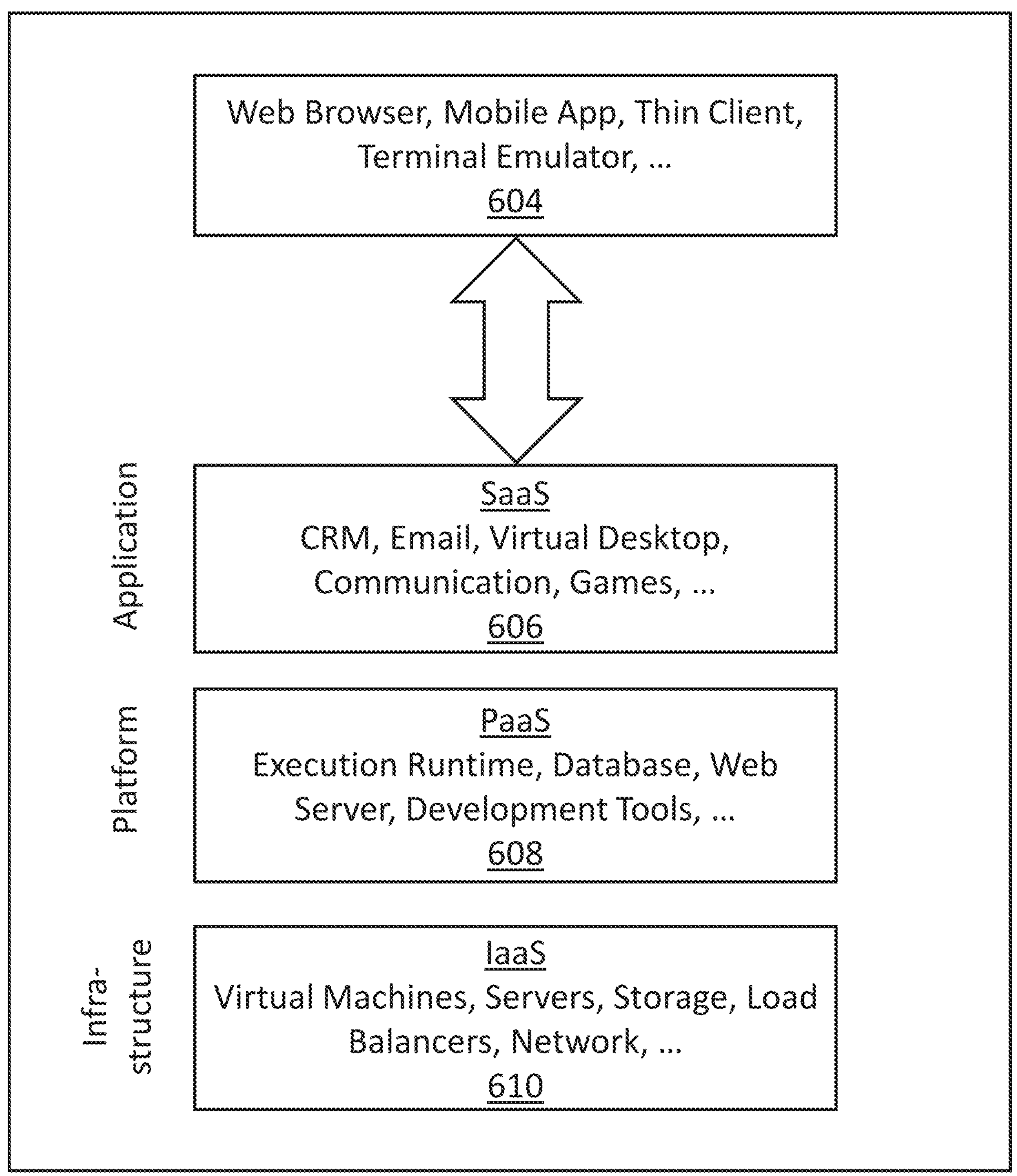
FIG. 6 depicts an exemplary implementation of an architecture according to some embodiments of the present disclosure.

Turning to FIG. 5 and FIG. 6, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 610, platform as a service (PaaS) 608, and/or software as a service (SaaS) 606 using a web browser, mobile app, thin client, terminal emulator or other endpoint 604. FIG. 5 and FIG. 6 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Messaging engine 200, as discussed above and further below in more detail, can include components for the disclosed functionality. According to some embodiments, messaging engine 200 may be a special purpose machine or processor, and can be hosted by a device on network 104, within cloud system 106, and/or on UE 102. In some embodiments, engine 200 may be hosted by a server and/or set of servers associated with cloud system 106.

According to some embodiments, as discussed in more detail below, messaging engine 200 may be configured to implement and/or control a plurality of services and/or microservices, where each of the plurality of services/microservices are configured to execute a plurality of workflows associated with performing the disclosed search functionality. Non-limiting embodiments of such workflows are provided below in relation to at least FIG. 3.

According to some embodiments, as discussed above, messaging engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102 over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
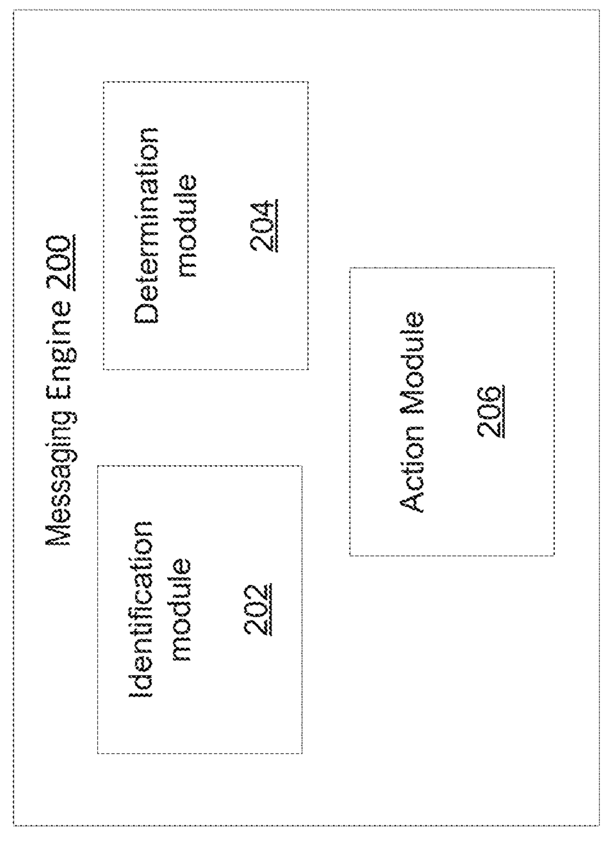
FIG. 2 is a block diagram illustrating components of an exemplary system according to some embodiments of the present disclosure.

As illustrated in FIG. 2, according to some embodiments, messaging engine 200 includes identification module 202, determination module 204 and action module 206. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below. Messaging engine 200 or other device(s) running Process 300 may be operated entirely at the user device level, or with cloud support as a distributed system, or at a mail service provider's infrastructure, as non-limiting implementation examples. It will be understood that the disclosure herein provides for a configuration that is platform agnostic and may be operated on multiple alternative platforms as a matter of design choice using the teachings described.

Figure 3:
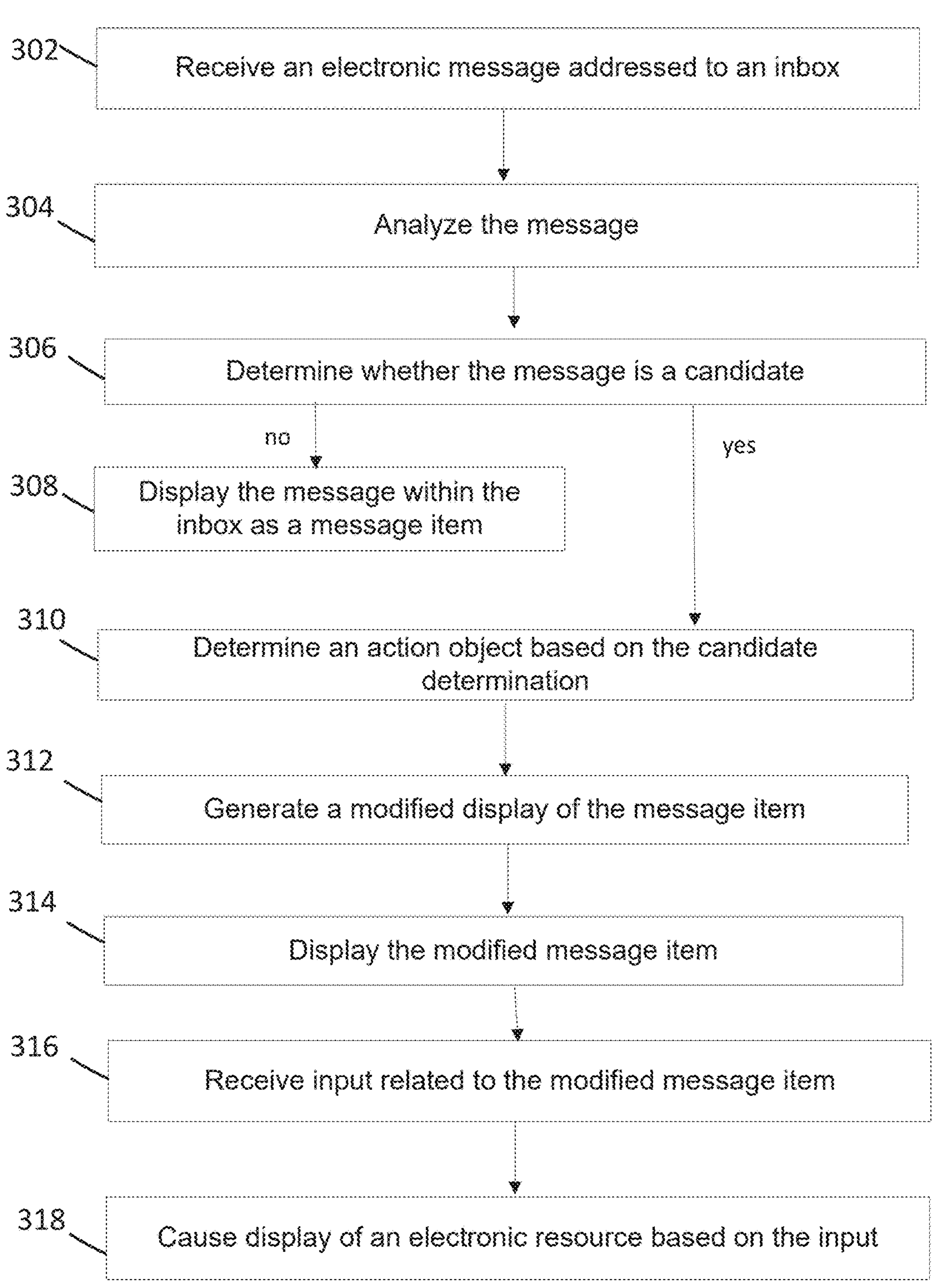
FIG. 3 illustrates an exemplary workflow according to some embodiments of the present disclosure.

Turning to FIG. 3, Process 300 provides non-limiting example embodiments for the disclosed electronic messaging functionality. As provided below, the disclosed framework's configuration and implementation can provide a computerized suite of tools for providing advancements in how users interact with electronic messages, as well as providing mechanisms for how such users can engage with content and services over a computer network.

According to some embodiments, Steps 302 and 316 of Process 300 can be performed by identification module 202 of messaging engine 200; Steps 304, 306 and 310 can be performed by determination module 204; and Steps 308 and 312-318 can be performed by action module 206.

According to some embodiments, Process 300 begins with Step 302 where an electronic message addressed to an inbox of a user is received. For example, sender X sends recipient Y an email. In some embodiments, engine 200 can identify (e.g., receive) the message upon the server associated with the email service providing the inbox receiving the message, and prior to delivery to the inbox account of the user.

In Step 304, upon receiving the message in Step 302, engine 200 can analyze the message. In some embodiments, Step 304 can involve analyzing each of the other messages already received and delivered to the inbox of the user. As provided below, this can provide a context for the subsequent action object determinations.

Accordingly, such analysis, regardless of whether the message received in Step 302 is the only message analyzed, and/or all or a portion of previously received messages are analyzed, engine 200's analysis involves performing a computational analysis of such message (and/or other previously received messages) to determine a context for the message.

According to some embodiments, such context can include information related to and/or be based on, but not limited to, an identity (ID) of the user, ID of the sender, type of sender, type of user, data/metadata related to content within the message, message type, content type within the message (e.g., images, text, video, hyperlinks, attachments, and the like), document object model (DOM) of the message, and the like, or some combination thereof.

In some embodiments, such analysis can involve parsing the message, identifying information within the header and/or body of the message, then performing such analysis, as discussed herein.

According to some embodiments, the analysis of the message can involve engine 200 performing a computational analysis that involves execution of an artificial intelligence and/or machine learning (AI/ML) model and/or an LLM. In some embodiments, the analysis and parsing of messages can be performed at the user device level, without the need for cloud communication, as devices are now and in the future capable of running AI applications in whole or in part without the need for cloud support.

According to some embodiments, the AI/ML models can be any type of known or to be known, specifically trained AI/ML model, particular machine learning model architecture, particular machine learning model type (e.g., convolutional neural network (CNN), recurrent neural network (RNN), autoencoder, support vector machine (SVM), and the like), or any other suitable definition of a AI/ML model or any suitable combination thereof.

In some embodiments, an LLM can be leveraged, as discussed herein, whether known or to be known. As discussed above, an LLM is a type of AI system designed to understand and generate human-like text based on the input it receives. The LLM can implement technology that involves deep learning, training data and natural language processing (NLP). Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. This includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, engine 200 may be configured to identify and utilize one or more AI/ML techniques selected from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model, b. transfer the input data to the neural network model, c. train the model incrementally, d. determine the accuracy for a specific number of timesteps, e. apply the trained model to process the newly received input data, f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Figure 4:
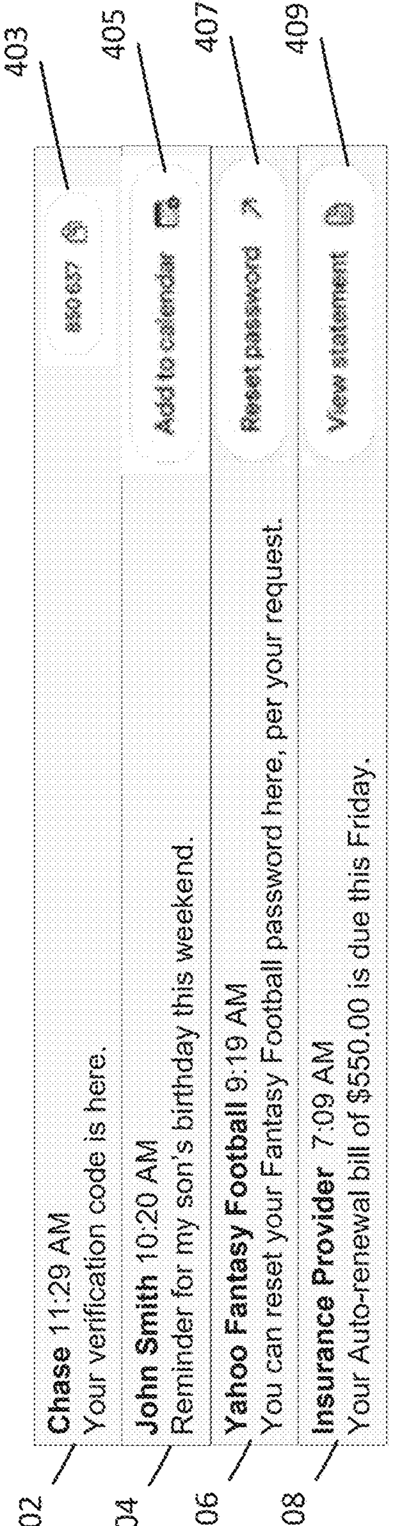
FIG. 4 depicts a non-limiting example embodiment according to some embodiments of the present disclosure.

Accordingly, in Step 306, engine 200 can determine whether the message is a candidate for an action object to be included within the message item displayed within the inbox (e.g., the message items in the listing of unopened messages in the inbox, as depicted in FIG. 4).

According to some embodiments, the action object can be any type of known or to be known interface object (IO) that can be displayed and interacted with from within a portion of an UI. For example, an action object can be, but is not limited to, a button, icons, image, text, and the like.

According to some embodiments, as discussed herein, the action object can include information related to, but not limited to, text, images, graphics, videos and/or other types of multi-media content. In some embodiments, as discussed herein, the action object can also or alternatively be configured as a hyperlinked IO (e.g., hyperlinked button) that links to or points to an electronic resource (e.g., application, web site, electronic document, file, electronic information (e.g., text, video, image, audio, multi-media, and the like), and the like). As provided herein, the type, functionality and/or format of the action object can be based on, but not limited to, the context of the message, content of the message, a time, date and/or other criteria that can correspond to the context for which the message was sent.

In some embodiments, action objects can correspond to a category, which can be predefined and/or dynamically determined based on the context of the message. For example, the action object can display information related to, but not limited to, a calendar, schedule, RSVP, order management, package tracking, viewing a bill, flight check-in, verification codes, password reset, E-signatures, getting directions, unsubscribe, spam reporting, invoice payment, shopping, reservations, appointment confirmations, claiming offers, donations, ticket purchases, and the like, or some combination thereof.

By way of example, when the user receives a message from the airline for which they are flying on tomorrow to check-in to their flight, upon the message being displayed within the inbox, the message item for the new message in the user's inbox can be customized to display an action object within the message item interface portion that enables the user to check-in. Such check-in button displayed therein, for example, upon interaction by a user, can be hyper-linked and can cause the browser to open another tab to display the website for the airline that enables the user to check-in. Thus, the functionality provided to the user via the message from the airline can be enabled and acted upon without actually requiring the user to open the message.

Turning back to Process 300, in Step 306, engine 200 can determine whether the message is a candidate for an action object, as discussed above. In some embodiments, such determination can be based on the context of the message as determined from the AI/ML and/or LLM analysis from Step 304. In some embodiments, the determination can be derived from the content in the body of the message, and/or the information in the header, as determined from the AI/ML and/or LLM analysis from Step 304. Such determination can discern whether a response is required and/or whether the requested action falls within a predetermined category of action objects.

In some embodiments, when the message is not determined to be a candidate by engine 200's analysis, Process 300 can proceed to Step 308, where the message is displayed as a new message according to traditional mechanisms.

In some embodiments, when engine 200 determines that the message is a candidate for an action object, Process 300 can proceed from Step 306 to Step 310, where engine 200 can determine and/or compile the action object. Such compilation can involve collecting data/metadata from the message, which can be based on the analysis from Step 304 and/or a further performed analysis.

Accordingly, in some embodiments, Step 310 can involve further analyzing the message via the AI/ML and/or LLM techniques discussed above. Based on such analysis, engine 200 can determine, but is not limited to, a type of action object, content to display within the action object, the target source for any hyperlinked resources, and the like.

For example, from the above airline check-in example, the action object can be a button that depicts the text "check-in", which is hyperlinked to the airline's check-in page. In another example, the action object can depict a hyperlinked image of an airplane.

According to some embodiments, the action object(s) can be stored in database 108. In some embodiments, the action object(s) can be stored in short-term memory of the user's device and/or in a network location that is purged upon the user interacting with the action object and/or a predetermined period of time expiring, for example.

In Step 312, engine 200 can generate the modified display of the message item. As discussed herein, the modified display of the message item includes the generated action object. And, in Step 314, such modified message item can be displayed as a new mail item in the inbox listing of the user's inbox account.

Turning to FIG. 4, depicted is the inbox listing 400 for a user's inbox, which includes message items 402, 404, 406 and 408, where each message item is for an individual message. As depicted within the message items 402, 404, 406 and 408, action objects 403, 405, 407 and 409 are displayed, respectively.

For example, the message for message item 402 is for a verification code provided by Chase® which enables the user to login to their account. Thus, rather than having to open the message, the user can simply provide input (e.g., select) the action object 403, which can cause the automatic copying of the displayed code (or enable copying of the code).

In another example, the user receives a message from "John Smith" about his birthday party in message item 404. Via compiled and displayed action object 403, the user can simply interact with the action object 403, whereby the user's native calendar application on their device can be opened and enable the created calendar event for the party to be added to their calendar.

In another example, the message item 406 can be for a message from the user, which upon interaction with the action object, can enable the user to reset their password. For example, upon interaction with action object 407, the webpage for the fantasy football league's password reset functionality can be displayed, thereby enabling the user to reset their password.

And, in yet another example, message item 408 can include action object 409, which can enable the user to select the object 409 and be taken to the payment page or their account page (e.g., or login page to access such pages) to render such payment.

Turning back to Process 300, in Step 316, engine 200 can receive input related to the modified message item. For example, as discussed above, the user can select the action object within the message item for the message.

And, in response to such interaction in Step 316, in Step 318, engine 200 can cause the display of a related electronic resource that is provided via the action object and is based on the message. For example, as depicted in FIG. 4, if the message is providing a verification code, the electronic resource can be the text of the code. In another example, if the message is for a future event (e.g., message item 404 and action object 405 from FIG. 4), the electronic resource can be an application for creating and saving the calendar event.

Accordingly, the electronic resource can be, but is not limited to, a network resource, local resource, text, image, video, and the like, and/or some combination thereof, which can enable the user to perform an action predicated upon the content and/or context of the message.

Accordingly, as provided via the steps of Process 300, as depicted in FIG. 4 as non-limiting examples, the disclosed framework provide novel mechanisms for modifying how an electronic message is displayed within an account inbox, whereby such modifications enable interactions with the content in the message as well as the electronic/network resources associated with such message/content without requiring the message to be opened.

Figure 7:
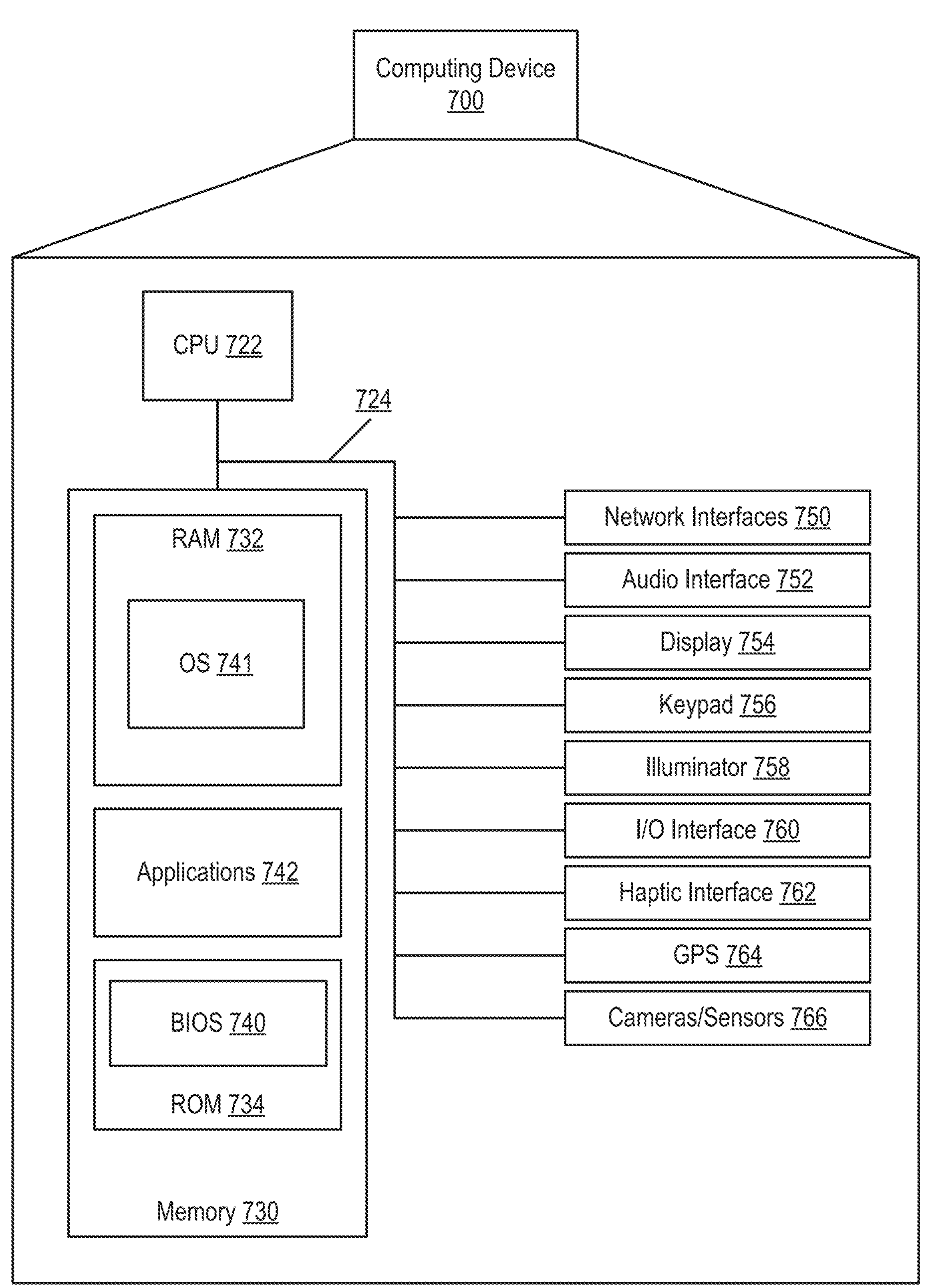
FIG. 7 is a block diagram illustrating a computing device showing an example of a client or server device used in various embodiments of the present disclosure.

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 discussed above at least in relation to FIG. 1.

As shown in the figure, in some embodiments, Client device 700 includes a processing unit (CPU) 722 in communication with a mass memory 730 via a bus 724. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. Power supply 726 provides power to Client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user.

Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of Client device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS or the like, to further determine the physical location of client device 700 on the surface of the Earth. In one embodiment, however, Client device 700 may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700.

Memory 730 further includes one or more data stores, which can be utilized by Client device 700 to store, among other things, applications 742 and/or other information or data. For example, data stores may be employed to store information that describes various capabilities of Client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving an electronic message addressed to an account of a user, the electronic message comprising content;

analyzing the electronic message, and determining a context of the electronic message, the context determination comprising determining if the content is associated with an electronic resource;

generating, based on the context of the electronic message, an action object, the action object comprising functionality for interacting with the electronic resource without opening the electronic message; and communicating, to an inbox listing of unopened messages in the inbox of the account, a message item for the electronic message, the message item comprising information about the electronic message and the action object, the action object being displayed within the message item and selectable therefrom without opening the electronic message.

2. The method of claim 1, further comprising:

receiving input related to the action object; and causing the electronic resource to be rendered in response to the input.

3. The method of claim 2, wherein the rendering of the electronic resource causes an application to open via a device of the user, the application being a type that enables interaction with the electronic resource.

4. The method of claim 1, wherein the electronic resource corresponds to at least one of an application, web site, electronic document, a file, and electronic information.

5. The method of claim 1, further comprising:

parsing the electronic message, and identifying information within a header and body of the electronic message;

analyzing the identified information within the header and the body of the electronic message; and determining the context based on the analysis of the identified information within the header and the body of the electronic message.

6. The method of claim 1, further comprising:

determining, based at least on the context of the electronic message, whether the electronic message is a candidate for display with an action object, wherein the generation of the action object is based on the candidate determination.

7. The method of claim 6, further comprising:

displaying the electronic message without compiling and displaying the action object when the candidate determination indicates the electronic message is not a candidate.

8. The method of claim 1, wherein the action object comprises functionality hyperlinking to at least one of a network location of the electronic resource, application associated with the electronic resource and application capable of rendering the electronic resource.

9. The method of claim 1, wherein the action object is a button comprising functionality for performing an electronic action upon interaction from within the message item.

10. The method of claim 1, wherein the analysis is performed via execution of at least one of an artificial intelligence (AI) model, machine learning (ML) model and large language model (LLM).

11. A system comprising:

a processor configured to:

receive an electronic message addressed to an account of a user, the electronic message comprising content;

analyze the electronic message, and determine a context of the electronic message, the context determination comprising determining if the content is associated with an electronic resource;

generate, based on the context of the electronic message, an action object, the action object comprising functionality for interacting with the electronic resource without opening the electronic message; and communicate, to an inbox listing of unopened messages in the inbox of the account, a message item for the electronic message, the message item comprising information about the electronic message and the action object, the action object being displayed within the message item and selectable therefrom without opening the electronic message.

12. The system of claim 11, wherein the processor is further configured to:

receive input related to the action object; and cause the electronic resource to be rendered in response to the input.

13. The system of claim 12, wherein the rendering of the electronic resource causes an application to open via a device of the user, the application being a type that enables interaction with the electronic resource.

14. The system of claim 11, wherein the electronic resource corresponds to at least one of an application, web site, electronic document, a file, and electronic information.

15. The system of claim 11, wherein the processor is further configured to:

parse the electronic message, and identify information within a header and body of the electronic message;

analyze the identified information within the header and the body of the electronic message; and determine the context based on the analysis of the identified information within the header and the body of the electronic message.

16. The system of claim 11, wherein the processor is further configured to:

determine, based at least on the context of the electronic message, whether the electronic message is a candidate for display with an action object, wherein the generation of the action object is based on the candidate determination.

17. The system of claim 16, wherein the processor is further configured to:

display the electronic message without compiling and displaying the action object when the candidate determination indicates the electronic message is not a candidate.

18. The system of claim 11, wherein the action object comprises functionality hyperlinking to at least one of a network location of the electronic resource, application associated with the electronic resource and application capable of rendering the electronic resource, wherein the action object is a button comprising functionality for performing an electronic action upon interaction from within the message item.

19. A non-transitory computer-readable storage medium tangibly encoded with computer-executable instructions that when executed by a device, perform a method comprising:

receiving an electronic message addressed to an account of a user, the electronic message comprising content;

analyzing the electronic message, and determining a context of the electronic message, the context determination comprising determining if the content is associated with an electronic resource;

generating, based on the context of the electronic message, an action object, the action object comprising functionality for interacting with the electronic resource without opening the electronic message; and communicating, to an inbox listing of unopened messages in the inbox of the account, a message item for the electronic message, the message item comprising information about the electronic message and the action object, the action object being displayed within the message item and selectable therefrom without opening the electronic message.

20. The non-transitory computer-readable storage medium of claim 19, further comprising:

receiving input related to the action object; and causing the electronic resource to be rendered in response to the input.

* * * * *